US009243682B2

(12) United States Patent
Avery et al.

(10) Patent No.: US 9,243,682 B2
(45) Date of Patent: Jan. 26, 2016

(54) DOUBLE KNIT TWILL FABRIC FOR POWER TRANSMISSION BELTS AND BELTS CONSTRUCTED THEREOF

(71) Applicants: Matthew Floyd Avery, Greensboro, NC (US); Terry Wayne Hinson, Kershaw, SC (US); Nicholas Edward Irwin, Greensboro, NC (US); William James Canipe, Cheraw, SC (US)

(72) Inventors: Matthew Floyd Avery, Greensboro, NC (US); Terry Wayne Hinson, Kershaw, SC (US); Nicholas Edward Irwin, Greensboro, NC (US); William James Canipe, Cheraw, SC (US)

(73) Assignee: Highland Industries, Inc., Kernersville, NC (US)

( * ) Notice: Subject to any disclaimer, the term of this patent is extended or adjusted under 35 U.S.C. 154(b) by 100 days.

(21) Appl. No.: 13/779,162

(22) Filed: Feb. 27, 2013

(65) Prior Publication Data

US 2014/0087904 A1    Mar. 27, 2014

Related U.S. Application Data

(60) Provisional application No. 61/705,496, filed on Sep. 25, 2012.

(51) Int. Cl.
*F16G 1/04* (2006.01)
*D03D 1/00* (2006.01)
*F16G 1/10* (2006.01)
*F16G 1/28* (2006.01)

(52) U.S. Cl.
CPC ............... *F16G 1/04* (2013.01); *D03D 1/0094* (2013.01); *F16G 1/10* (2013.01); *F16G 1/28* (2013.01)

(58) Field of Classification Search
CPC ................ F16G 1/04; F16G 1/10; F16G 1/28
USPC ........................ 474/200–267; 156/140, 333–5
See application file for complete search history.

(56) References Cited

U.S. PATENT DOCUMENTS

| | | | | |
|---|---|---|---|---|
| 3,060,078 A | * | 10/1962 | Atwell | 156/335 |
| 3,609,999 A | | 10/1971 | Blore | 66/196 |
| 3,853,017 A | * | 12/1974 | White et al. | 474/238 |
| 4,096,764 A | * | 6/1978 | Richmond | F16G 5/166 |
| | | | | 156/139 |
| 4,123,946 A | * | 11/1978 | Hollaway, Jr. | F16G 1/16 |
| | | | | 156/137 |
| 4,305,714 A | | 12/1981 | Renshaw | 474/250 |
| 4,414,047 A | * | 11/1983 | Wetzel | B29D 29/08 |
| | | | | 156/138 |
| 4,518,375 A | | 5/1985 | Mashimo et al. | 474/205 |
| 4,632,665 A | | 12/1986 | Skura | 474/205 |
| 4,826,472 A | | 5/1989 | Sato et al. | 474/202 |
| 5,362,281 A | | 11/1994 | Dutton et al. | 474/205 |
| 5,427,728 A | | 6/1995 | Beck et al. | 264/229 |
| 5,529,545 A | | 6/1996 | Isshiki et al. | 474/205 |
| 5,645,504 A | | 7/1997 | Westhoff | 474/250 |
| 6,863,761 B2 | | 3/2005 | Knutson | 156/137 |
| 2002/0144779 A1 | * | 10/2002 | Pelton | 156/327 |

(Continued)

FOREIGN PATENT DOCUMENTS

EP            0 446 977         7/1994

*Primary Examiner* — William E Dondero
*Assistant Examiner* — Robert T Reese
(74) *Attorney, Agent, or Firm* — Blake P. Hurt; Tuggle Duggins P.A.

(57) ABSTRACT

A power transmission belt. The power transmission belt includes a body having an inner perimeter and an outer perimeter. A fabric is attached to the inner perimeter of the body for reinforcement wherein the fabric is a double knit fabric formed using textured yarns in at least the cross-machine direction. The belt may further include a layer of reinforcing cords surrounding the outer perimeter of the body.

48 Claims, 5 Drawing Sheets

(56) References Cited

U.S. PATENT DOCUMENTS

| | | | |
|---|---|---|---|
| 2007/0023127 A1* | 2/2007 | Onita et al. | 156/140 |
| 2007/0071942 A1 | 3/2007 | Callaway et al. | 428/95 |
| 2008/0108466 A1 | 5/2008 | Pelton | 474/250 |
| 2009/0258744 A1 | 10/2009 | Leighton et al. | 474/267 |
| 2010/0167860 A1* | 7/2010 | Mori | B29D 29/103 474/252 |
| 2010/0173740 A1* | 7/2010 | Mori et al. | 474/252 |
| 2011/0003659 A1 | 1/2011 | Wu et al. | 474/250 |
| 2013/0190120 A1* | 7/2013 | Fan | 474/205 |

\* cited by examiner

CYLINDER

|    | F1 | F2 | F3 | F4 | F5 | F6 | F7 | F8 | F9 | F10 | F11 | F12 |
|----|----|----|----|----|----|----|----|----|----|-----|-----|-----|
| T1 | W  | K  | K  | W  | K  | K  | K  | W  | W  | K   | T   | W   |
| T2 | W  | K  | K  | K  | W  | W  | K  | T  | W  | W   | K   | K   |
| T3 | K  | W  | W  | K  | T  | W  | W  | K  | K  | W   | K   | K   |
| T4 | K  | T  | W  | W  | K  | K  | W  | K  | K  | K   | W   | W   |

NEEDLE SETUP

|    | F1 | F2 | F3 | F4 | F5 | F6 | F7 | F8 | F9 | F10 | F11 | F12 |
|----|----|----|----|----|----|----|----|----|----|-----|-----|-----|
| T1 |    |    |    | X  |    |    |    | X  |    |     |     | X   |
| T2 |    |    | X  |    |    |    | X  |    |    |  X  |     |     |
| T3 |    | X  |    |    |    | X  |    |    |    |  X  |     |     |
| T4 | X  |    |    |    | X  |    |    |    | X  |     |     |     |

DIAL

|    | F1 | F2 | F3 | F4 | F5 | F6 |
|----|----|----|----|----|----|----|
| T1 | W  | W  | W  | K  | W  | W  |
| T2 | X  | W  | W  | W  | W  | W  |

NEEDLE SETUP

|    | F1 | F2 | F3 | F4 | F5 | F6 |
|----|----|----|----|----|----|----|
| T1 | X  |    | X  |    | X  |    |
| T2 |    | X  |    | X  |    | X  |

X = Needle In
K = Knit
T = Tuck
W = Welt

WIDTH OF SELVAGE: _______

DOUBLE KNIT TWILL FABRIC FOR POWER TRANSMISSION BELTS AND BELTS CONSTRUCTED THEREOF

BACKGROUND

1. Field

The present inventions relate generally to reinforcing fabrics for power transmission belts and, more specifically, to a double knit twill fabric for reinforcing power transmission belts and the belts that are constructed using this fabric.

2. Related Art

Cogged or grooved power transmission belts, such as continuously variable transmission (CVT) belts, timing belts and poly v-belts, often utilize a cog and groove covering fabric along the inner portion of the belt which contacts the drive motor shaft to prevent cracking and to provide reinforcement and wear resistance during belt use. The fabric substrate is typically composed of polyamide yarns and can achieve high degrees of elongation in a single direction, even at relatively low stresses.

The fabric substrate's ability to stretch allows for the formation of each cog/groove during the compression or expansion molding that takes place during the belt cure cycle as the belt is being formed. In addition, the fabric substrate's elasticity provides resilience and flexural integrity during belt use.

Current woven fabric substrates have limitations. For one, elongation is generally limited to only one direction for such fabrics, which restricts cog/groove formation during production. In addition, while woven fabric has excellent performance strike-through characteristics, it is quite expensive to manufacture. Knitted fabrics could be much cheaper to manufacture and provide some elongation in both the machine and the cross-machine direction. However, because knitted fabrics have a propensity to stretch, inter-yarn interstitial spaces are created, which permits excessive strike-through. This is also an unacceptable characteristic.

Thus, there remains a need for a new and improved fabric substrate for use with power transmission belts that provides elongation in both the machine and cross-machine direction while, at the same time limits strike-through.

SUMMARY

The present inventions are directed to a power transmission belt. The power transmission belt includes a body having an inner perimeter and an outer perimeter. A fabric is attached to the inner perimeter of the body for reinforcement wherein the fabric is a double knit fabric formed using textured yarns in at least the cross machine direction. The belt may further include a layer of reinforcing cords surrounding the outer perimeter of the body of the belt.

The double knit fabric may be a twill construction. In one embodiment, the twill construction is a modified reverse tuck and welt to prevent skip off.

The greige fabric may be between about 38 and about 42 wales per inch and between about 32 and about 34 courses per inch. In one embodiment, the greige fabric is about 40 wales per inch and about 33 courses per inch.

The bulked fabric may be between about 52 and about 58 wales per inch and between about 35 and about 39 courses per inch. In one embodiment, the bulked fabric is about 55 wales per inch and about 37 courses per inch.

The yarns in both the machine and the cross machine direction may be textured yarns. In one embodiment, the yarns are false twist textured.

The yarns may be between about 70 denier and about 140 denier. In one embodiment, the yarns are two ply 70 denier. In one embodiment, the yarns are 70 denier.

The textured yarn may be a nylon. In one embodiment, the nylon is nylon 6,6.

The double knit fabric may further include a bonding agent applied to the fabric. Possible bonding agents include Resorcinol Formaldehyde Latex (RFL) and Resorcinol Formaldehyde Neoprene Latex (RFN).

The power transmission belt may further include a backing layer attached to the layer of reinforcing cords. In one embodiment, the backing layer is formed of an elastomeric material. Also, the backing layer may further include at least one position indicator. In one embodiment, the at least one position indicator includes a plurality of spaced apart cogs for engaging an encoder.

The power transmission belt inner perimeter may include a plurality of teeth or grooves for engaging a drive motor. Also, in one embodiment, the power transmission belt body is formed of an elastomeric material. The elastomeric material may be rubber.

The power transmission belt may be selected from the group consisting of synchronous belts, CVT belts, timing belts, v-belts and poly v-belts.

Accordingly, one aspect of the present invention is to provide a power transmission belt, the power transmission belt including (a) a body having an inner perimeter and an outer perimeter; and (b) a fabric attached to the inner perimeter of the body for reinforcement wherein the fabric is a double knit fabric.

Another aspect of the present invention is to provide a fabric for attachment to the inner perimeter of the body of a power transmission belt, the fabric including a double knit fabric formed using textured yarns in at least the cross machine direction.

Still another aspect of the present invention is to provide a power transmission belt, the power transmission belt including (a) a body having an inner perimeter and an outer perimeter; (b) a fabric attached to the inner perimeter of the body for reinforcement wherein the fabric is a double knit fabric formed using textured yarns in at least the cross machine direction; and (c) a layer of reinforcing cords surrounding the outer perimeter of the body.

These and other aspects of the present invention will become apparent to those skilled in the art after a reading of the following description of the preferred embodiment when considered with the drawings.

BRIEF DESCRIPTION OF THE DRAWINGS

FIG. 4 is a perspective view of an inside section of a belt showing undesirable strike-through;

DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
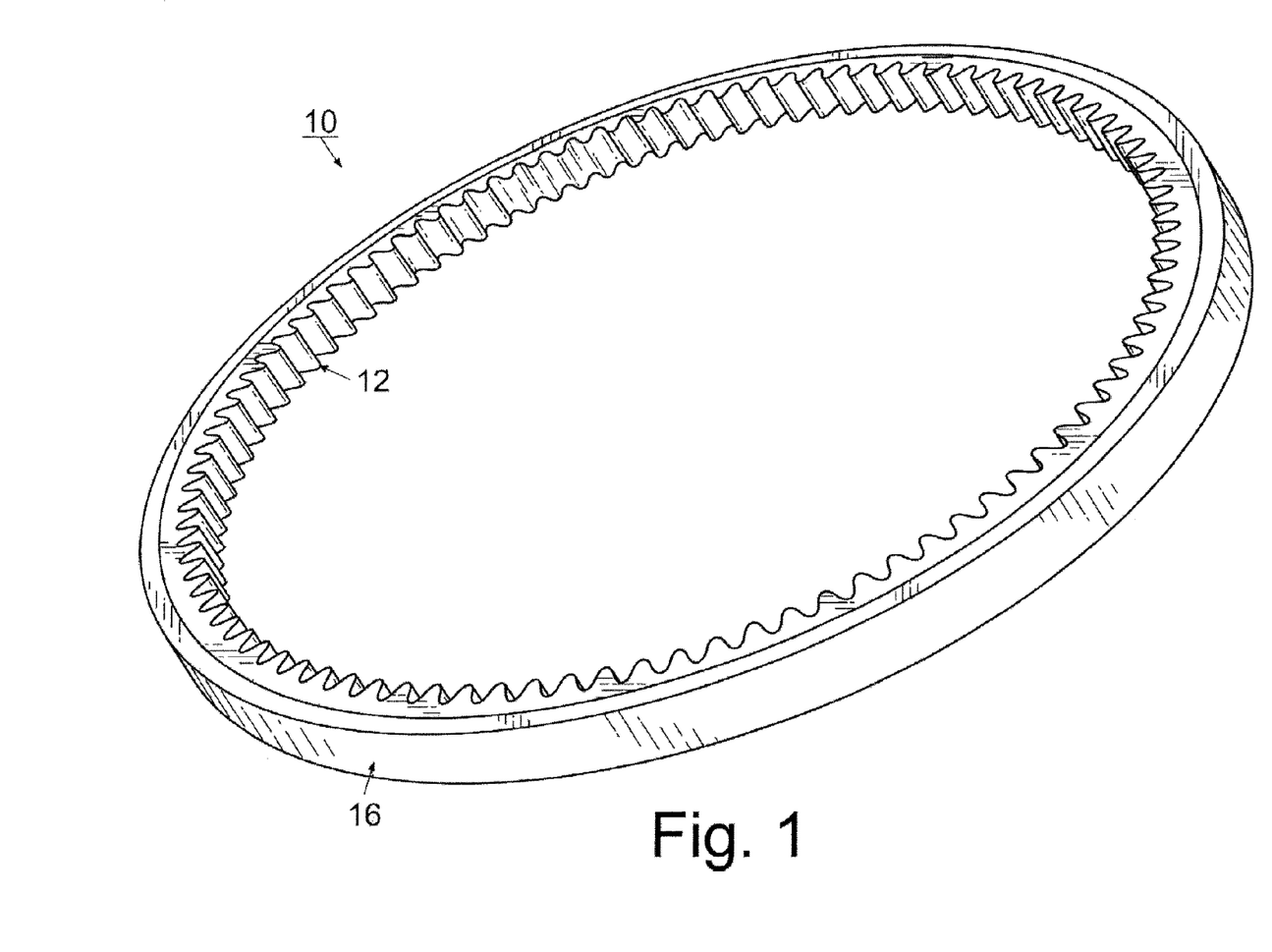
FIG. 1 is a power transmission belt constructed according to the present inventions.
Figure 2:
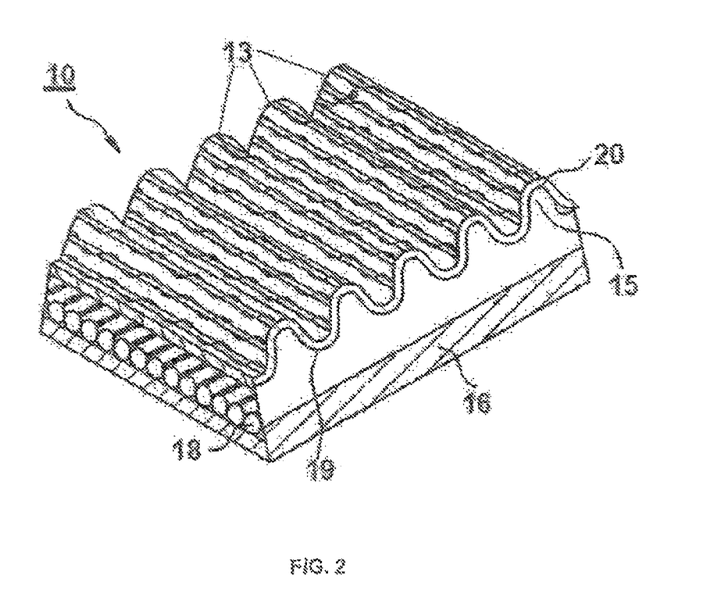
FIG. 2 schematically represents an enlarged sectional perspective view of the power transmission belt shown in FIG. 1.
Figure 3:
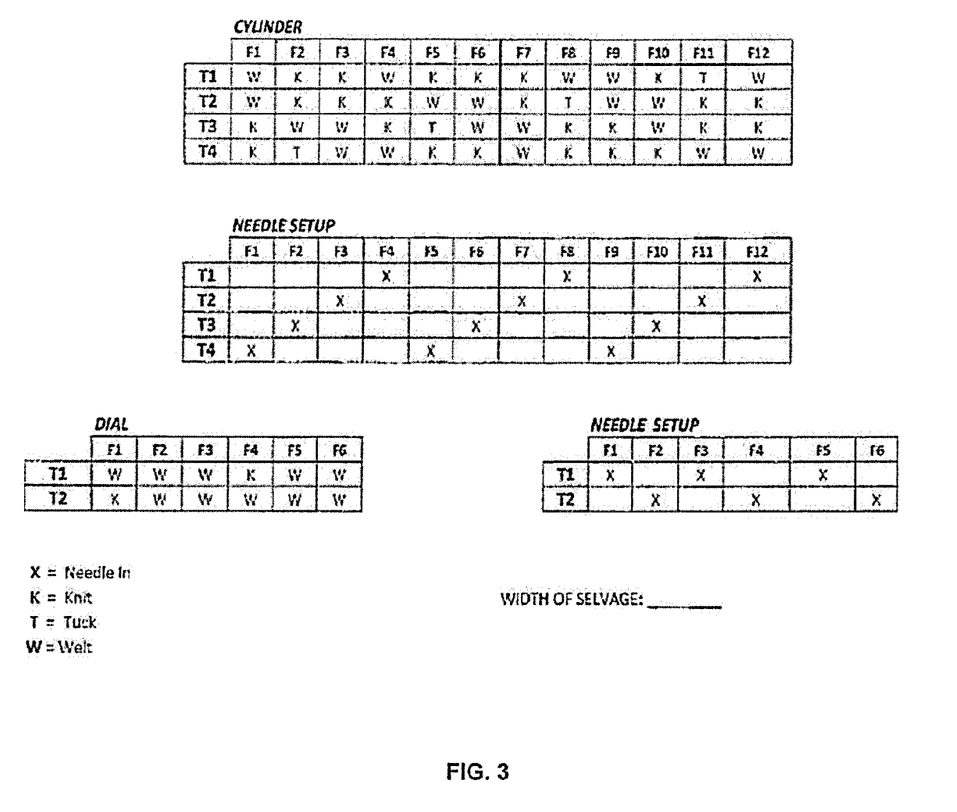
FIG. 3 is a knitting needle set-up for forming a knitted fabric of the present inventions.

FIG. 2 schematically depicts a section of belt 10, although it should be understood that belt 10 is typically circular, as shown in FIG. 1, with inner perimeter 12 forming the inside circumference, and backing 16 forming the outside circumference, and outer perimeter 14 (FIG. 4) between the inner perimeter and backing.

As shown in FIG. 2, belt 10 generally includes body 15 having a plurality of teeth 13, covered in fabric 20. The region of body 15 including or nearby fabric 20 is deemed inner perimeter 12, while region of body away from fabric is deemed outer perimeter 14 (see FIG. 4 also).

Adjacent to, and surrounding outer perimeter 14 is a plurality of reinforcing cords 18, which are also adjacent to, and attached to backing layer 16. Outer perimeter 14 and backing layer 16 are preferably mechanically and chemically bonded to cords 18, with cords 18 preferably coated with RFL to improve adhesion. Inner perimeter 12 includes a plurality of teeth 12 for engaging a drive motor.

Figure 5:
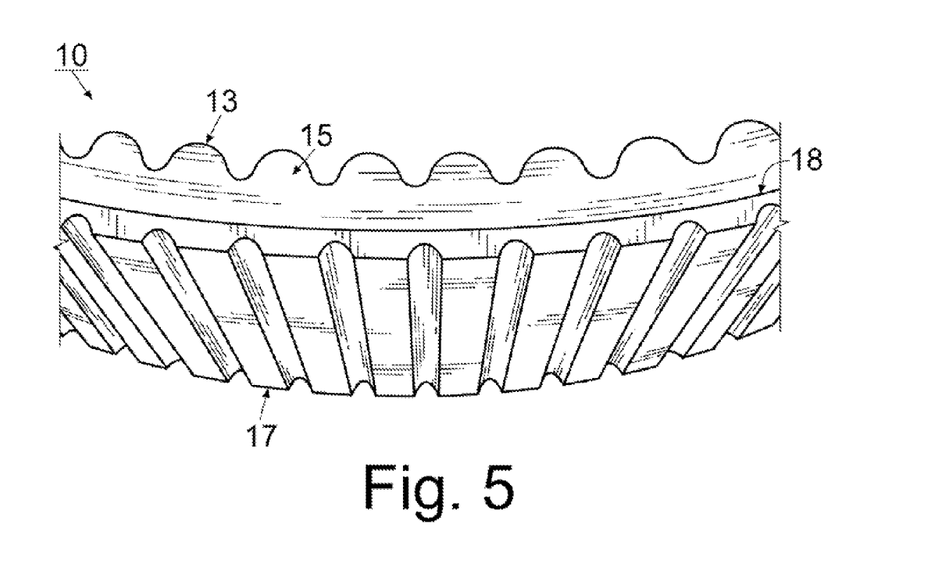
FIG. 5 is a perspective view of an outside section of the belt shown in FIG. 4.

Backing layer is desirably formed of an elastomeric material such as rubbers such as hydrogenated nitrile butadiene rubber (HNBR) and polychloroprene rubber (CR) and may include at least one position indicator, such as a plurality of spaced apart cogs 17 for engaging an encoder, as shown in FIG. 5. Alternatively, backing layer 16 may be smooth, as originally shown in FIG. 1.

Reinforcing fabric 20, which is attached to inner perimeter 12 of body 15, is a double knit twill construction and composed of 1/70d/34 Textured Nylon 6,6 yarns, at least in the cross machine direction. The twill construction may be a modified reverse tuck and welt, so as to prevent or reduce skip off. It is preferable that the greige fabric is between about 38 and about 42 wales per inch (wpi), with a count of approximately 40 wpi being most preferred; and between about 32 and about 34 courses per inch (cpi), with a count of 33 cpi being most preferred.

The fabric is knitted in circular (tubular) form and undergoes a bulking/slitting/drying finishing process to enhance elongation in the cross-machine direction. Drying may include heat-setting. It is preferable that the bulked fabric is between about 52 and about 58 wpi, with a count of approximately 55 wpi being most preferred; and between about 35 and about 39 cpi, with a count of 37 cpi being most preferred.

During the finishing process, the double knit twill substrate is bulked in a 230° F. jet for 20 minutes to maximize yarn crimp and shrinkage. During the bulking process, the fabric's width can be compacted by as much as 30%. After bulking, the fabric is slit open into a flat substrate and processed down a tenter frame for dimensional stabilization. The fabric is introduced to the tenter frame at 25% overfeed and processed at a speed of 35 yards per minute. During processing on the tenter frame, the fabric is passed through an oven at approximately 305° F. to be dried. Once the fabric has been dried and stabilized on the tenter frame, it may undergo a second pass during which a resorcinol formaldehyde latex (RFL) coating is applied. During the coating process, the fabric is passed through an in-line dip pad with a pad pressure of approximately 40 psi and speed of 35 yards per minute before being dried in the tenter frame oven at 300-340° F.

The resulting finished fabric has the following physical properties:

TABLE 1

| Treatment | Width (in) | WPI | CPI | Weight (oz/yd$^2$) | Gauge (in) |
|---|---|---|---|---|---|
| No Chemicals | 48-52 | 54-57 | 36-38 | 6.1-6.9 | 0.028-0.032 |
| RFL Finish | 48-52 | 52-55 | 36-38 | 6.4-7.2 | 0.028-0.032 |

TABLE 2

| | Grab Tensile | | % Elongation @ Break | | % Elongation @ 2 kg/25 mm |
|---|---|---|---|---|---|
| Treatment | Machine (lbf) | Cross (lbf) | Machine | Cross | Cross |
| No Chemicals | 165-190 | 140-170 | 115-135 | 210-240 | 105-125 |
| RFL Finish | 165-190 | 140-170 | 80-100 | 180-210 | 65-85 |

Figure 4:
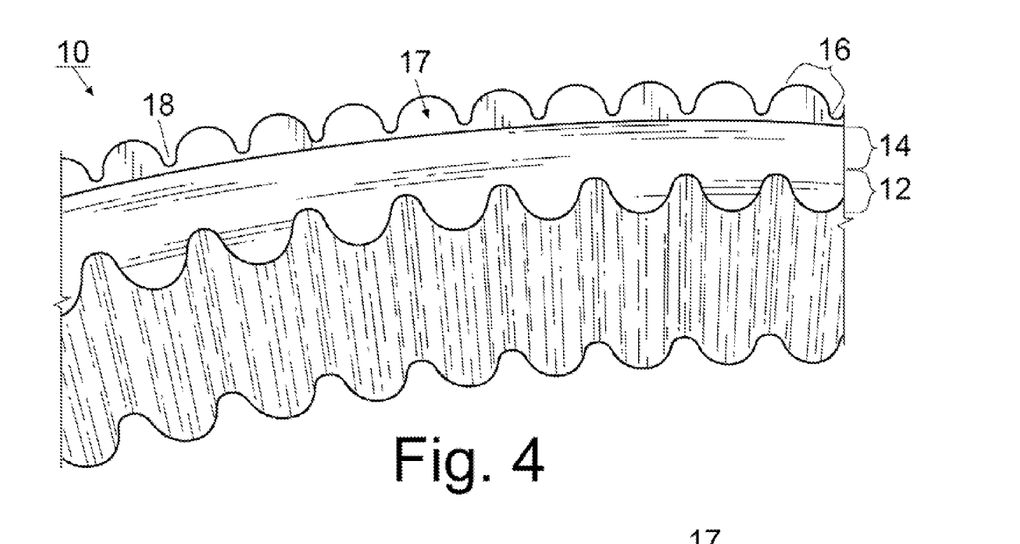

The reinforcing fabric of the present inventions provides a high degree of elongation in the cross-machine direction allowing for ease of tooth/groove formation during the belt formation process. However, in the course of developing fabrics according to the present inventions it was determined that elongation, alone, did not provide superior performance. Specifically, the phenomenon known in the art as "strike-through" or "pinheads" may arise when belt body material traverses the interstitial spaces of fabric during the tooth/groove formation process. This is shown in FIG. 4 and is considered unacceptable in the industry.

Thus, the technical challenge became designing a circular knit, double knit twill fabric that exhibited enough elongation to facilitate tooth/groove formation, while, at the same time, prevent or limit strike-through. Surprisingly, it was discovered that the air permeability of the fabric at at least a minimum pressure threshold was a strong predictor of resistance to strike-through.

Figure 6:
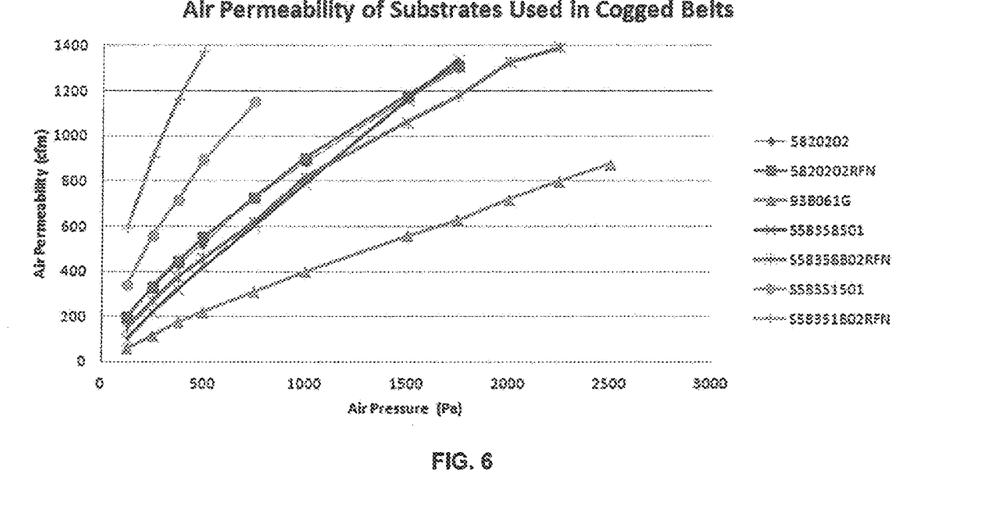
FIG. 6 is a graphical illustration of the relationship between air pressure and air permeability in a variety of fabric substrates shown in Table 3 including an embodiment of the present inventions.

More specifically, referring to FIG. 6, it can be seen that a variety of substrates exhibit characteristics with respect to permeability as different air pressures. These experiments were conducted by ASTM D 737.

The following table summarizes the data:

TABLE 3

| Sample | Style | Description Vaccum Pressure (Pa): | 125 | 250 | 375 | 500 | 750 | 1000 | 1500 | 1750 | 2000 | 2250 | 2500 |
|---|---|---|---|---|---|---|---|---|---|---|---|---|---|
| | | | | | | | Average Air Permeability (cfm) @ 125-2500 Pa | | | | | | |
| 1 | 5820202 | PET/COT Double Jersey Knit | 188 | 324 | 429 | 521 | 724 | 881 | 1167 | 1300 | | | |
| 2 | 5820202RFN | RFN Treated PET/COT Double Jersey Knit | 200 | 332 | 446 | 552 | 728 | 905 | 1183 | 1313 | | | |

TABLE 3-continued

| Sample | Style | Description Vaccum Pressure (Pa): | Average Air Permeability (cfm) @ 125-2500 Pa | | | | | | | | | | |
|---|---|---|---|---|---|---|---|---|---|---|---|---|
| | | | 125 | 250 | 375 | 500 | 750 | 1000 | 1500 | 1750 | 2000 | 2250 | 2500 |
| 3 | 93B061G | Stretch NYL Woven Twill (textured yarns) | 60 | 115 | 174 | 222 | 310 | 398 | 557 | 629 | 717 | 801 | 875 |
| 4 | S58358501 | Stretch NYL Double Knit Twill (textured yarns) | 102 | 218 | 319 | 420 | 604 | 788 | 1160 | 1340 | | | |
| 5 | S58358B02RFN | RFN Treated Stretch NYL Double Knit Twill (textured yarns) | 153 | 269 | 374 | 459 | 620 | 816 | 1063 | 1180 | 1327 | 1393 | |
| 6 | S583S1501 | Stretch NYL Double Knit Twill (non-textured yarns) | 341 | 559 | 717 | 896 | 1153 | | | | | | |
| 7 | S58351B02RFN | RFN Treated Stretch NYL Double Knit Twill (non-textured yarns) | 594 | 907 | 1167 | 1377 | | | | | | | |

Interestingly, the samples having the greatest strike-through (samples 1; 2; 4; 6 and 7) exhibit air permeability of greater than about 1000 cfm when subjected to a constant of air pressure of about 1500 Pa. Conversely, samples 3 and 5, (woven and present invention, respectively) have less strike-through and exhibit air permeability of less than about 1000 cfm when subjected to a constant of air pressure of about 1500 Pa. Thus, the threshold may be considered to have air permeability of less than about 1000 cfm when subjected to a constant of air pressure of about 1500 Pa. Alternatively, the threshold may be considered less than about 800 cfm at a constant air pressure of about 1000 Pa. As can be appreciated from FIG. 6, the air permeability of the tested fabrics could be tested at higher air pressures, and also be used to indicate acceptable fabric constructions. However, it appears from FIG. 6 that lower air pressures would not begin to do so—see e.g. sample 4, which does not begin to deviate until about 1250 Pa.

It should be pointed out again that of the two acceptable samples, sample 5 is a knitted fabric constructed according to the present inventions and sample 3 is a commercially available twill woven fabric using nylon 6,6 yarns, which is known in the industry.

Figure 7:
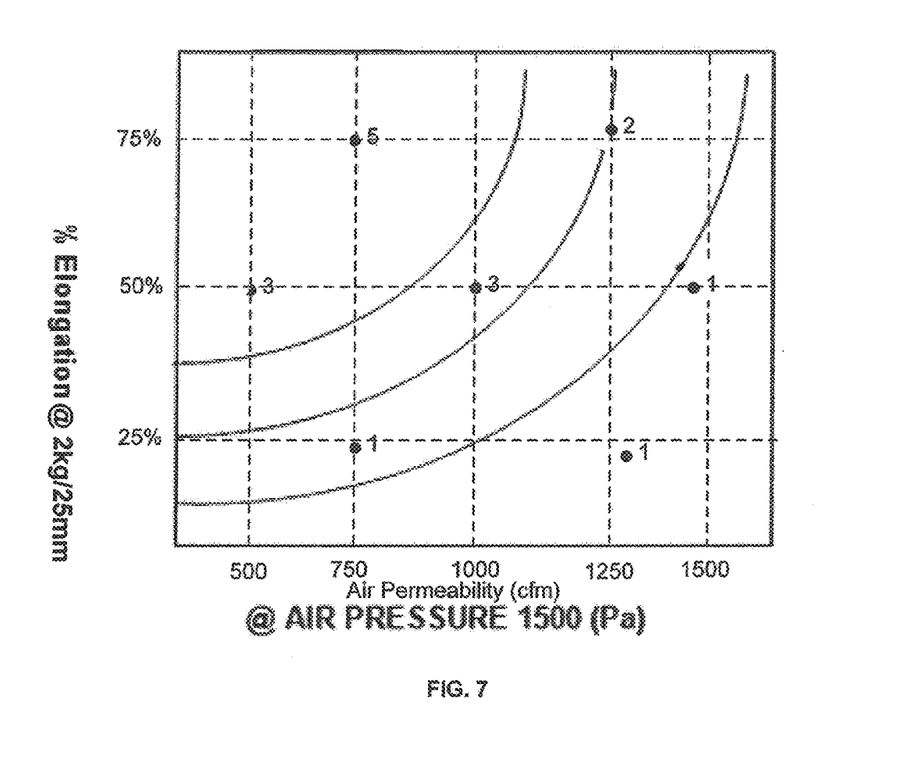
FIG. 7 is a graphical illustration of a response surface response depicting improved belt performance as a function of decreasing air permeability (@ constant air pressure of about 1500 (Pa)) and increasing % elongation of the fabric of the present inventions.

The effect of the characteristics of the fabric substrate on a power transmission belt constructed using various fabric substrates may be more easily understood by turning to FIG. 7. FIG. 7 is a graphical illustration of a response surface showing belt quality generally corresponding ease of molding and reduced strike-through. Belt quality is shown on a 1 to 5 scale with 1 being poor, 3 being average and 5 being best. As can be understood from a review of FIG. 7, improved belt quality can now be seen to be seen as a function of reduced air permeability (@ constant air pressure of about 1500 (Pa)) and increased % elongation of the fabric substrate. As can also be appreciated, these fabric characteristics are generally opposed to one another but can be achieved by the fabric substrates of the present inventions.

In use, the fabric may be used in the current orientation or cut and turned 90 degrees to align the substrate's high-elongation direction longitudinally with the belt's teeth/grooves.

Certain modifications and improvements will occur to those skilled in the art upon a reading of the foregoing description. By way of example, yarns of multiple plies or heavier deniers may be used in the construction. Yarns of different materials such as those which are meta-aramid or para-aramid may be used in conjunction with nylon 6,6. The fabric may be knit at wider or narrower widths and finished to wider or narrower widths. Alternative coatings such as acrylic binders may be used to treat the finished fabric. It should be understood that all such modifications and improvements have been deleted herein for the sake of conciseness and readability but are properly within the scope of the following claims. It should also be understood that all ranges set forth herein include the endpoints, as well as increments there between. By way of example, 1-5 includes 1.1; 1.2; 1.3 and so forth.

We claim:

1. A power transmission belt, said power transmission belt comprising:
    (a) a body having an inner perimeter and an outer perimeter; and
    (b) a fabric attached to the inner perimeter of said body for reinforcement wherein said fabric is a double knit fabric, wherein in said fabric is a modified reverse tuck and welt twill construction to prevent skip off.

2. The belt according to claim 1 further including a layer of reinforcing cords surrounding the outer perimeter of said body.

3. The belt according to claim 2 further including a backing layer attached to said layer of reinforcing cords.

4. The belt according to claim 3, wherein said backing layer is formed of an elastomeric material.

5. The belt according to claim 3, wherein said backing layer further includes at least one position indicator.

6. The belt according to claim 5, wherein said at least one position indicator includes a plurality of spaced apart cogs for engaging an encoder.

7. The belt according to claim 1, wherein said inner perimeter includes a plurality of teeth or grooves for engaging a drive motor.

8. The belt according to claim 1, wherein said body is formed of an elastomeric material.

9. The belt according to claim 8, wherein said elastomeric material is rubber.

10. The belt according to claim 1, wherein said belt is selected from the group consisting of synchronous belts, CVT belts, timing belts, v-belts and poly v-belts.

11. A power transmission belt comprising a fabric for attachment to the inner perimeter of the body of a power transmission belt, said fabric comprising: a double knit fabric formed using textured yarns in at least the cross machine direction, wherein in said fabric is a modified reverse tuck and welt twill construction to prevent skip off.

12. The power transmission belt according to claim 11, wherein the greige fabric is between about 38 and about 42 wales per inch and between about 32 and about 34 courses per inch.

13. The power transmission belt according to claim 12, wherein the greige fabric is about 40 wales per inch and about 33 courses per inch.

14. The power transmission belt according to claim 11, wherein the bulked fabric is between about 52 and about 58 wales per inch and between about 35 and about 39 courses per inch.

15. The power transmission belt according to to claim 14, wherein the bulked fabric is about 55 wales per inch and about 37 courses per inch.

16. The power transmission belt according to claim 11, wherein the yarns in both the machine and the cross machine direction are textured yarns.

17. The power transmission belt according to claim 16, wherein said yarns are false twist textured.

18. The power transmission belt according to claim 11, wherein said yarns are between about 70 denier and about 140 denier.

19. The power transmission belt according to claim 18, wherein said yarns are two ply 70 denier.

20. The power transmission belt according to claim 18, wherein said yarns are 70 denier.

21. The power transmission belt according to claim 11, wherein said textured yarn is a nylon.

22. The power transmission belt according to claim 21, wherein said nylon is nylon 6,6.

23. The power transmission belt according to claim 11 further including a bonding agent applied to said fabric.

24. The power transmission belt according to claim 23, wherein said bonding agent is selected from the group consisting of Resorcinol Formaldehyde Latex (RFL) and Resorcinol Formaldehyde Neoprene (RFN).

25. The power transmission belt according to claim 24 wherein said bonding agent is a Resorcinol Formaldehyde Neoprene (RFN).

26. A power transmission belt, said power transmission belt comprising:
(a) a body having an inner perimeter and an outer perimeter;
(b) a fabric attached to the inner perimeter of said body for reinforcement wherein said fabric is a double knit fabric formed using textured yarns in at least the cross machine direction, wherein in said fabric is a modified reverse tuck and welt twill construction to prevent skip off; and
(c) a layer of reinforcing cords surrounding the outer perimeter of said body.

27. The belt according to claim 26 further including a backing layer attached to said layer of reinforcing cords.

28. The belt according to claim 27, wherein said backing layer is formed of an elastomeric material.

29. The belt according to claim 27, wherein said backing layer further includes at least one position indicator.

30. The belt according to claim 29, wherein said at least one position indicator includes a plurality of spaced apart cogs for engaging an encoder.

31. The belt according to claim 26, wherein said inner perimeter includes a plurality of teeth or grooves for engaging a drive motor.

32. The belt according to claim 26, wherein said body is formed of an elastomeric material.

33. The belt according to claim 32, wherein said elastomeric material is rubber.

34. The belt according to claim 26, wherein said belt is selected from the group consisting of synchronous belts, CVT belts, timing belts, v-belts and poly v-belts.

35. The belt according to claim 28, wherein the greige fabric is between about 38 and about 42 wales per inch and between about 32 and about 34 courses per inch.

36. The belt according to claim 35, wherein the greige fabric is about 40 wales per inch and about 33 courses per inch.

37. The belt according to claim 26, wherein the bulked fabric is between about 52 and about 58 wales per inch and between about 35 and about 39 courses per inch.

38. The belt according to claim 37, wherein the bulked fabric is about 55 wales per inch and about 37 courses per inch.

39. The belt according to claim 26, wherein the yarns in both the machine and the cross machine direction are textured yarns.

40. The belt according to claim 39, wherein said yarns are false twist textured.

41. The belt according to claim 26, wherein said yarns are between about 70 denier and about 140 denier.

42. The belt according to claim 41, wherein said yarns are two ply 70 denier.

43. The belt according to claim 41, wherein said yarns are 70 denier.

44. The belt according to claim 26, wherein said textured yarn is a nylon.

45. The belt according to claim 44, wherein said nylon is nylon 6, 6.

46. The belt according to claim 26 further including a bonding agent applied to said fabric.

47. The belt according to claim 46, wherein said bonding agent is selected from the group consisting of Resorcinol Formaldehyde Latex (RFL) and Resorcinol Formaldehyde Neoprene (RFN).

48. The belt according to claim 47 wherein said bonding agent is a Resorcinol Formaldehyde Neoprene (RFN).

* * * * *